United States Patent
Hata et al.

(10) Patent No.: US 6,691,809 B2
(45) Date of Patent: Feb. 17, 2004

(54) POWER OUTPUT APPARATUS, MOTOR VEHICLE INCLUDING POWER OUTPUT APPARATUS AND CONTROL METHODS THEREOF

(75) Inventors: Hiroshi Hata, Susono (JP); Masahiro Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 09/939,790

(22) Filed: Aug. 28, 2001

(65) Prior Publication Data
US 2002/0023790 A1 Feb. 28, 2002

(30) Foreign Application Priority Data
Aug. 29, 2000 (JP) .......................... 2000-259298

(51) Int. Cl.[7] ................................. B60K 6/04
(52) U.S. Cl. ..................................... 180/65.3
(58) Field of Search .................... 180/65.1, 65.2, 180/65.3, 65.4, 233, 242, 243; 701/22, 70

(56) References Cited

U.S. PATENT DOCUMENTS

| | | | | |
|---|---|---|---|---|
| 4,335,429 A | * | 6/1982 | Kawakatsu | 180/65.2 |
| 5,465,806 A | * | 11/1995 | Higasa et al. | 180/65.1 |
| 5,549,172 A | * | 8/1996 | Mutoh et al. | 180/65.1 |
| 5,664,635 A | * | 9/1997 | Koga et al. | 180/65.3 |
| 5,680,908 A | * | 10/1997 | Reed | 180/65.3 |
| 6,082,476 A | * | 7/2000 | Stulbach | 180/65.3 |
| 6,223,842 B1 | * | 5/2001 | Masaki | 180/65.5 |
| 6,295,487 B1 | * | 9/2001 | Ono et al. | 701/22 |
| 6,302,227 B1 | * | 10/2001 | Takemura et al. | 180/65.2 |
| 6,468,175 B1 | * | 10/2002 | Lehongre | 180/65.2 |
| 6,484,833 B1 | * | 11/2002 | Chhaya et al. | 180/65.1 |

FOREIGN PATENT DOCUMENTS

| | | |
|---|---|---|
| JP | 09175203 A | 7/1997 |
| JP | 11332020 A | 11/1999 |

* cited by examiner

*Primary Examiner*—Frank Vanaman
(74) *Attorney, Agent, or Firm*—Pillsbury Winthrop LLP

(57) ABSTRACT

At a time of backward movement, a ring gear shaft, and thus a front axle, is disconnected from a planetary gear by a clutch, and a carrier and a ring gear, and thus, a crank shaft and a sun gear shaft, are connected to each other by the clutch, whereby a hybrid motor vehicle is constructed as a series-type hybrid electric motor vehicle, thereby outputting a torque in accordance with a depressed amount of an accelerator pedal to the front axle and a rear axle by a motor MG2 and a motor MG3 at a suitable torque distribution for backward movement. When a state of charge of a battery is small, power is generated by a motor MG1 using a power obtained by driving an engine so as to be supplied to the motor MG2 and the motor MG3.

24 Claims, 8 Drawing Sheets

POWER OUTPUT APPARATUS, MOTOR VEHICLE INCLUDING POWER OUTPUT APPARATUS AND CONTROL METHODS THEREOF

INCORPORATION BY REFERENCE

The disclosure of Japanese Patent Application No. 2000-259298, filed Aug. 29, 2000, including the specification, drawings and abstract, is incorporated herein by reference in its entirety.

BACKGROUND OF THE INVENTION

1. Field of the Invention

The invention relates to a power output apparatus and a motor vehicle provided with the same, and more particularly to a power output apparatus capable of outputting power to a plurality of drive shafts, including a first drive shaft, a motor vehicle including a power output apparatus, and control methods thereof.

2. Description of Related Art

There has been proposed power output apparatus for a four-wheel drive vehicle having electric motors respectively attached to a front axle connected to a front wheel and a rear axle connected to a rear wheel and a power output apparatus for a four-wheel drive motor vehicle having electric motors respectively attached to rotating shafts of four wheels. In these power output apparatus, the electric motor is driven by using electric power charged in a battery or the electric motor is driven by using electric power obtained by operating a generator with power from an internal combustion engine.

Further, as other power output apparatuses, there have been proposed by the applicant a power output apparatus in which power is output to a first drive shaft by using power from an internal combustion engine and charged and discharged electric power of a battery by a planetary gear and two electric motors and power is output from a third electric motor to a second drive shaft by using the charged and discharged electric power of the battery (described in Japanese Patent Publication No. 9-175203, hereinafter, referred to as a mechanical distribution type power output apparatus), and a power output apparatus in which power is output to a first drive shaft by using power from an internal combustion engine and charged and discharged electric power of a battery by a twin-rotor electric motor having a first rotor connected to an output shaft of the internal combustion engine and a second rotor connected to a first drive shaft, and a second electric motor attached to the first drive shaft, and power is output from a third electric motor to a second drive shaft by using the charged and discharged electric power of the battery (described in Japanese Patent Publication No. 11-332020, hereinafter, referred to as an electrical distribution type power output apparatus).

In the case that the aforementioned power output apparatus is mounted to a moving body, particularly to a vehicle, it is necessary to output the power in correspondence to a motion requirement for the moving body. For example, in the case that the power output apparatus is mounted on the vehicle, both power for moving the vehicle forward and power for moving the vehicle backward are required.

In the apparatus that drives the electric motor by using the electric power charged in the aforementioned battery, and the apparatus that drives the electric motor by using the electric power generated with the power from the internal combustion engine, it is possible to switch an operation between forward movement and backward movement only by changing a direction of rotation of the electric motor, so that there is no problem in switching the direction. However, in the former, since it requires a long time to charge the battery, it is impossible to stand against a long time continuous use, and in the latter, since it is necessary to take into consideration an efficiency of power generation and an efficiency of the electric motor, energy efficiency is reduced.

In the electrical distribution type power output apparatus and the mechanical distribution type power output apparatus which have been proposed by the applicant, a part of the power from the internal combustion engine is directly output to the first drive shaft so as to rotate the first drive shaft. Further, it is normal to set the direction of rotation of the first drive shaft at this time to a direction of rotation according to a direction for moving the vehicle forward. Accordingly, in the case of moving the vehicle backward, that is, in the case of reverse rotation of the first drive shaft, it is necessary to take into consideration the power directly output from the internal combustion engine. In this case, in the electrical distribution type power output apparatus, an example of a control in the case of reverse rotation of the first drive shaft has been proposed in Japanese Patent Publication No. 11-332020, mentioned above.

SUMMARY OF THE INVENTION

It is one aspect of the invention to improve the practicability of a power output apparatus.

In accordance with a first aspect of the invention, there is provided a power output apparatus capable of outputting power to a plurality of drive shafts, including a first drive shaft. The power output apparatus is provided with an internal combustion engine having an output shaft, a power splitting and integrating mechanism, a first electric driving apparatus, a second electric driving apparatus, a third electric driving apparatus, a battery, a state of charge detecting apparatus, and a reverse rotation driving controller.

In this case, the power splitting and integrating mechanism is connected to rotating shafts comprising an output shaft in the internal combustion engine, the first drive shaft and a power splitting and integrating shaft, and is structured such that when power is input from any rotating shaft of the three rotating shafts, the power is split into the other two rotating shafts, and when the power is input from any two rotating shafts of the three rotating shafts, the input power is integrated so as to be output to the other rotating shaft. The first electric driving apparatus is connected to the power splitting and integrating shaft, and can generate electric power. The second electric driving apparatus is connected to the first drive shaft and can generate electric power. The third electric driving apparatus is connected to at least one drive shaft other than the first drive shaft and can generate electric power. The battery can send and receive electric power with respect to the first electric driving apparatus, the second electric driving apparatus and the third electric driving apparatus, respectively. The state of charge detecting apparatus detects a state of charge of the battery. The reverse rotation driving controller controls driving of the internal combustion engine, driving of the first electric driving apparatus, driving of the second electric driving apparatus and driving of the third electric driving apparatus on the basis of the detected state of charge so that power for reverse rotation opposite a normal rotation is output to the first drive shaft and the at least one drive shaft connected to the third electric driving apparatus at the suitable torque ratio.

In the power output apparatus of the first aspect of the invention, the driving of the internal combustion engine, the driving of the first electric driving apparatus, the driving of the second electric driving apparatus and the driving of the third electric driving apparatus are controlled by the reverse rotation driving controller on the basis of the state of charge of the battery. Accordingly, the power output apparatus can output the power for reverse rotation opposite the normal rotation to the first drive shaft and the at least one drive shaft connected to the third electric driving apparatus at the suitable torque ratio.

In accordance with a second aspect of the invention, there is provided a power output apparatus capable of outputting power to a plurality of drive shafts including a first drive shaft. The power output apparatus is provided with an internal combustion engine and integrating action of the power splitting and integrating mechanism. As a result, it is possible to increase an energy efficiency at a degree not having an effect of the splitting and integrating action of the power splitting and integrating mechanism, and it is possible to easily control the first electric driving apparatus that outputs the power to the first drive shaft.

In accordance with a third aspect of the invention, there is provided a motor vehicle including the power output apparatus of the first aspect or the second aspect of the invention. In this case, the first drive shaft is connected to a front axle connected to a front wheel of a vehicle. The at least one drive shaft connected to the third electric driving apparatus is connected to a rear axle connected to a rear wheel of the vehicle. The normal rotation corresponds to a rotation for moving the vehicle forward.

In accordance with the third aspect of the invention, there is provided a motor vehicle capable of outputting power to a front wheel and a rear wheel.

The motor vehicle is provided with a front-wheel-power output apparatus, a rear-wheel-power output apparatus, a battery, a state of charge detecting apparatus, and a backward movement driving controller.

In this case, the front-wheel-power output apparatus has a first electric motor capable of outputting power to the front wheel. The rear-wheel-power output apparatus has a second electric motor capable of outputting power to the rear wheel. The battery supplies an electric power to the front-wheel-power output apparatus and the rear-wheel-power output apparatus. The state of charge detecting apparatus detects a state of charge of the battery. The backward movement driving controller sets a torque ratio between the front wheel and the rear wheel on the basis of the detected state of charge. The backward movement driving controller also controls driving of the front-wheel-power output apparatus and driving of the rear-wheel-power output apparatus so that the power for moving the vehicle backward at the set torque ratio is output to the front wheel and the rear wheel.

In the motor vehicle of the third aspect of the invention, since the torque ratio between the front wheel and the rear wheel is set on the basis of the state of charge of the battery, and the driving of the front-wheel-power output apparatus and the driving of the rear-wheel-power output apparatus are controlled so that the power for moving the vehicle backward at the suitable torque ratio is output to the front wheel and the rear wheel, it is possible to control the backward movement in correspondence to the state of charge of the battery.

DETAILED DESCRIPTION OF THE PREFERRED EMBODIMENTS

Figure 1:
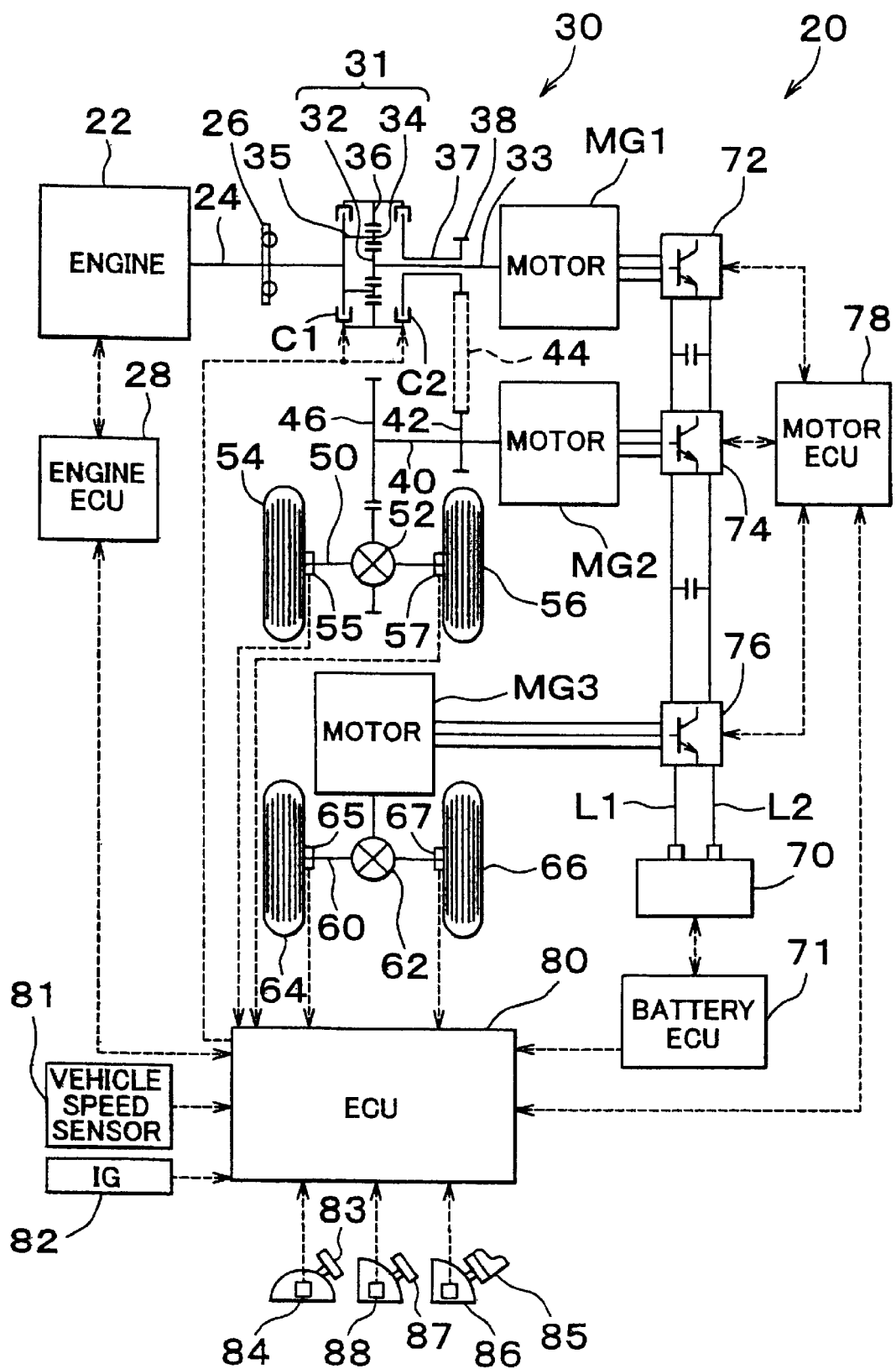
FIG. 1 is a block schematic diagram showing a hybrid motor vehicle including a power output apparatus according to an exemplary embodiment of the invention.

Next, various exemplary embodiments of the invention will be explained. FIG. 1 is a block schematic diagram of a hybrid motor vehicle 20 including a power output apparatus according to the invention. The hybrid motor vehicle 20 includes an engine 22, a gear unit 30, a motor MG1, a motor MG2, a motor MG3, a battery 70 and a hybrid electronic control unit (hereinafter referred to as an ECU) 80.

The gear unit 30 is connected to a crank shaft 24 of the engine 22, and can split power output from the engine 22 into a sun gear shaft 33 and a ring gear shaft 37 at a constant torque ratio. The motor MG1 is connected to the sun gear shaft 33 of the gear unit 30 and can generate electric power. The motor MG2 is connected to the ring gear shaft 37 and connected to a front axle 50 of front wheels 54 and 56, and can generate electric power. The motor MG3 is connected to a rear axle 60 of rear wheels 64 and 66, and can generate electric power. The battery 70 can send and receive electric power to and from the motors MG1, MG2 and MG3, respectively. The ECU 80 controls the whole system.

The engine 22 is an internal combustion engine driven by gasoline. The engine 22 is controlled by an engine ECU 28. The driving of the engine 22 is controlled by the engine ECU 28 by controlling a fuel injection amount and a volume of intake air so that the engine 22 is driven at the most efficient drive point among drive points capable of outputting an target engine output value Pe* input from the ECU 80 from the engine 22, on the basis of the target engine output value Pe*.

The gear unit 30 includes a planetary gear 31 including a sun gear 32, a ring gear 36 and a plurality of planetary pinion gears 34 provided therebetween. A crank shaft 24 of the engine 22 is connected to a carrier 35 connecting the planetary pinion gears 34 of the planetary gear 31 via a damper 26. The motor MG1 is connected to the sun gear 32 via the sun gear shaft 33. The ring gear 36 is connected to the carrier 35 and the ring gear shaft 37 in correspondence to an engaging state of a clutch C1 and a clutch C2. A gear 38, connected by a gear 42 provided in a rotating shaft 40 of the motor MG2 and a belt 44, is mounted to the ring gear shaft 37. The rotating shaft 40 of the motor MG2 is connected to the front axle 50 via a gear 46 and a differential gear 52. Accordingly, the ring gear shaft 37 is connected to the front axle 50 of the front wheels 54 and 56.

Each of the motors MG1, MG2 and MG3 is a PM type synchronous generator motor provided with a rotor in which a permanent magnet is adhered to an outer peripheral surface, and a stator around which a three-phase coil is wound. Further, a dummy three-phase electric current generated by switching six switching elements is applied to the three-phase coil, whereby the motors MG1, MG2 and MG3 are driven. The switching elements are provided to each of inverter circuits 72, 74 and 76 having electric power lines L1 and L2 connected to a terminal of the battery 70 as a positive bus bar and a negative bus bar. In this case, switching control of each of the switching elements in the inverter circuits 72, 74 and 76, that is, drive control of the motors MG1, MG2 and MG3, is executed by a motor ECU 78. Drive control of the motors MG1, MG2 and MG3 by the motor ECU 78 is executed by switching and controlling the switching elements in the inverter circuits 72, 74 and 76 so that torque corresponding to torque commands Tm1*, Tm2* and Tm3* are output from the motors MG1, MG2 and MG3 on the basis of the torque commands Tm1*, Tm2* and Tm3* of the motors MG1, MG2 and MG3 input from the ECU 80.

The battery 70 is an assembled battery constituted by serially connecting a plurality of unit cells capable of being charged and discharged, for example, a nickel hydride battery, a lithium ion battery and the like, and is controlled by a battery ECU 71. The control of the battery 70 executed by the battery ECU 71 includes calculation of a state of charge executed on the basis of charging and discharging electric current detected by an electric current sensor (not shown) or a voltage sensor (not shown) connected to the output terminals of the battery 70, or a voltage between the terminals. The control further includes equalization of the battery state of charge SOC of each of the unit cells executed similarly on the basis of the charging and discharging electric current detected by the electric current sensor or the voltage sensor or the voltage between the terminals, and a cooling operation control executed on the basis of battery temperature detected by a temperature sensor (not shown) mounted to the battery 70.

The ECU 80 is a microprocessor, constituted by a CPU, and is provided with a ROM storing a processing program, a RAM temporarily storing data, an input and output port, and a communication port. The communication port of the ECU 80 is connected to communication ports of the engine ECU 28, the battery ECU 71 and the motor ECU 78, and can send and receive various kinds of data with respect to the engine ECU 28, the battery ECU 71 and the motor ECU 78. Further, through input ports, the ECU 80 receives a vehicle speed V from a vehicle speed sensor 81, an ignition signal from an ignition switch 82, a shift position SP from a shift position sensor 84 detecting a position of a shift lever 83, an accelerator pedal position AP from an accelerator pedal position sensor 86 detecting a position of an accelerator pedal 85, a brake pedal position BP from a brake pedal position sensor 88 detecting a position of a brake pedal 87, wheel speeds Vw1 to Vw4 of respective wheels from wheel speed sensors 55, 57, 65 and 67, respectively mounted to the front wheels 54 and 56 and the rear wheels 64 and 66. Also, through output ports, the ECU 80 sends drive signals to the clutches C1 and C2.

Figure 2:
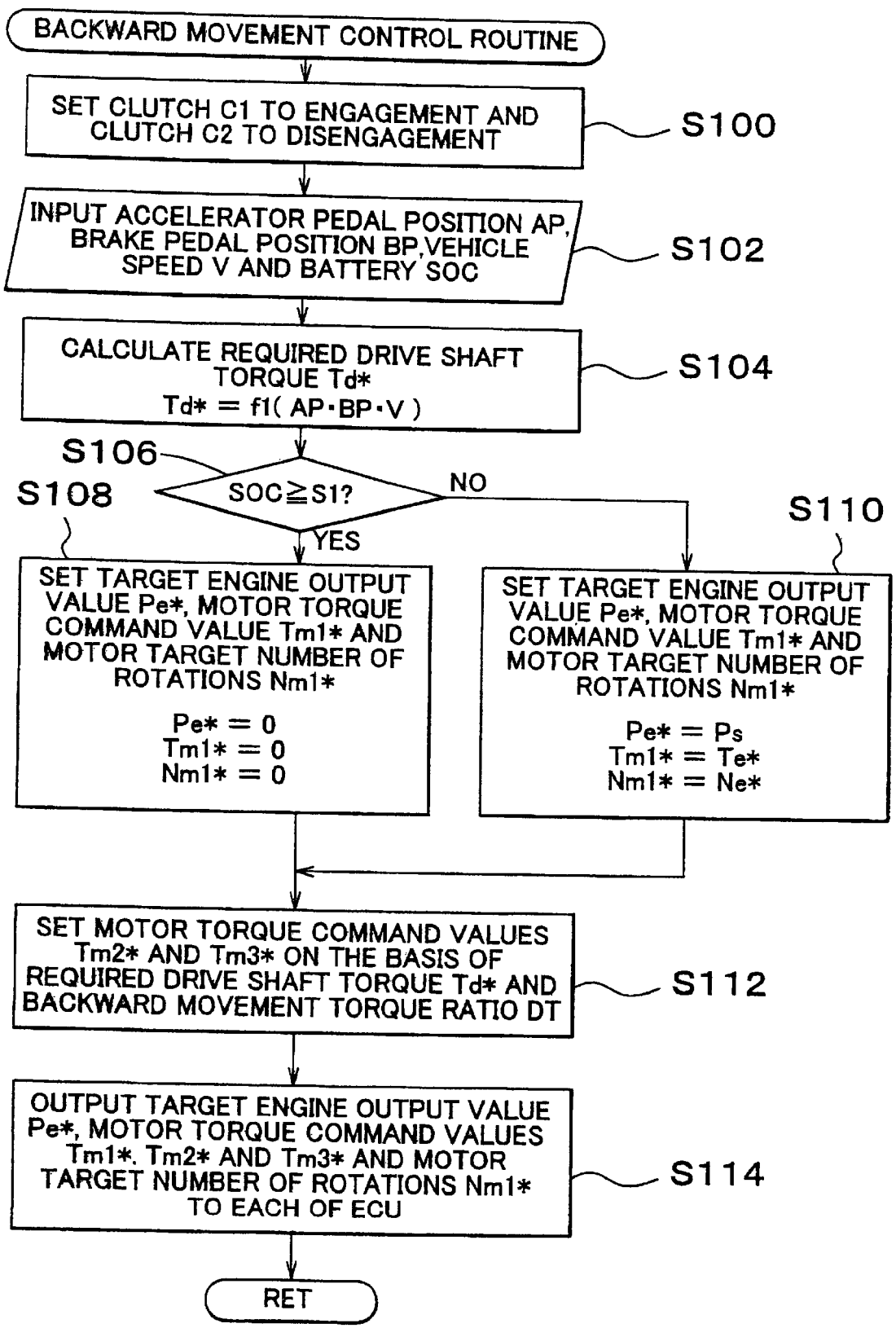
FIG. 2 is a flow chart showing an exemplary embodiment of a backward movement control routine according to the invention.

Next, a description will be given of control of the hybrid motor vehicle 20 for running in reverse. FIG. 2 is a flow chart showing an example of a control routine for running in reverse, which is executed by the ECU 80 of the hybrid motor vehicle 20. This routine is executed at a time when the shift position sensor 84 detects that the shift lever 83 is operated to the reverse position.

When the backward movement control routine is executed, in S100 the CPU of the ECU 80 engages the clutch C1 and disengages the clutch C2. This clutch setting engages the planetary pinion gear 34 and the ring gear 36, that is, the crank shaft 24 of the engine 22 is directly connected to the motor MG1. Further, the ring gear shaft 37 is disengaged from the planetary gear 31, that is, the engagement between the rotating shaft 40 of the motor MG2 gear-connected to the front axle 50 and the planetary gear 31 and the rotating shaft 40 and the planetary gear 31 are disengaged from each other. When the clutches C1 and C2 are set in the manner of S100, the control routine proceeds to S102 and the ECU 80 reads the vehicle speed V detected by the vehicle speed sensor 81, the accelerator pedal position AP detected by the accelerator pedal position sensor 86, the brake pedal position BP detected by the brake pedal position sensor 88, and the battery SOC calculated by the battery ECU 71 via the input ports and the communication ports. Here, the vehicle speed V is a vehicle speed detected by the vehicle speed sensor 81, however, the vehicle speed V may be calculated from the wheel speeds Vw1 to Vw4 detected by the wheel speed sensors 55, 57, 65, 67.

Figure 3:
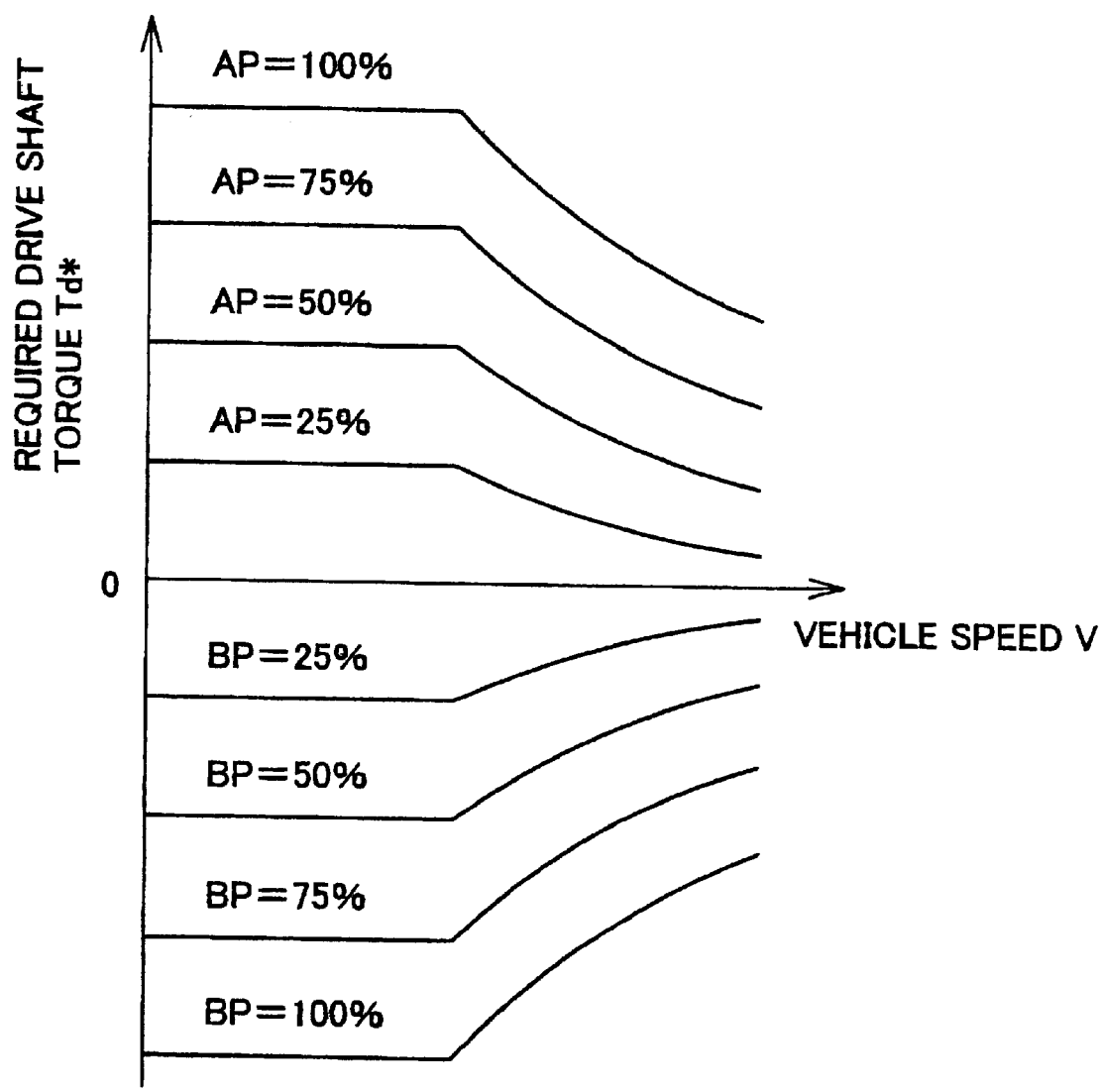
FIG. 3 is a map of a relation between an accelerator pedal position AP, a brake pedal position BP, a vehicle speed V and a drive shaft torque Td* at a time of backward movement.

In S104, a required drive shaft torque Td* corresponding to a torque required in the drive shaft of the vehicle is calculated on the basis of the acceleration pedal position AP, the brake pedal position BP and the vehicle speed V. In this embodiment, a map previously defining a relation among the acceleration pedal position AP, the brake pedal position BP, the vehicle speed V and the required drive shaft torque Td* is stored in the ROM of the ECU 80. The corresponding required drive shaft torque Td* is obtained from the map in response to the input of the acceleration pedal position AP, the brake pedal position BP, and vehicle speed V. FIG. 3 shows an example of a relation among the acceleration pedal position AP, the brake pedal position BP, the vehicle speed V and the required drive shaft torque Td* at a time of backward movement. In this embodiment, when the accelerator pedal 85 is depressed, the required drive shaft torque Td* becomes a positive value and when the brake pedal 87 is depressed, the required drive shaft torque Td* becomes a negative value.

Next, in S106 it is judged whether or not the battery state of charge SOC is equal to or more than a predetermined state of charge S1 of the battery 70. The predetermined state of charge S1 is a state of charge of the battery 70 required for moving the vehicle backward, and is determined on the basis of a capacity and a performance of the battery 70. When the battery state of charge SOC is equal to or more than the predetermined state of charge S1 (S106:Yes), it is judged that the electric power required for moving the vehicle backward is left in the battery 70 and the control routine proceeds to S108 where the target engine output value Pe*, the torque command value Tm1* and the target number of rotations Nm1* of the motor MG1 are set to 0. The control routine then proceeds to S112 where, the torque command values Tm2* and Tm3* of the motors MG2 and MG3 are set so that the required drive shaft torque Td* is distributed to the front wheels and the rear wheels at a backward movement torque ratio DT. Here, the backward movement torque ratio DT is a torque ratio for backward movement selected, among torque ratios between torque output to the front wheels 54, 56 and torque output to the rear wheels 64, 66. The backward movement torque ratio DT is defined on the basis of a type and a specification of the vehicle, and is preferably set to a value within a range of between 1:9 and 9:1.

Then, in S114 the ECU 80 outputs the target engine output value Pe*, the torque commands Tm1*, Tm2* and Tm3* of the motors MG1, MG2 and MG3, and the target number of rotations Nm1 of the motor MG1 to the engine ECU 28 and the motor ECU 78. Subsequently, the control routine ends. The engine ECU 28, after receiving the target engine output value Pe*, controls the driving of the engine 22 so that the engine 22 is driven at a drive point set as the target engine output value Pe*, that is, at a drive point set on the basis of the target engine torque Te* and the target engine speed Ne*. Here, since the target engine output value Pe* is set to 0, a stop command to stop the engine 22 is executed. The motor ECU 78, after receiving the torque command values Tm1*, Tm2* and Tm3* of the motors MG1, MG2 and MG3 and the target number of rotations Nm1 * of the motor MG1, controls the number of rotations of the motor MG1 while using the torque command value Tm1* so that the motor MG1 is driven at the target number of rotations Nm1 *. At the same time, the motor ECU 78 controls driving of the motor MG2 and the motor MG3 so that torque corresponding to the torque command values Tm2* and Tm3* are output from the motor MG2 and the motor MG3, respectively. Here, since both of the target number of rotations Nm1 * and the torque command value Tm1* of the motor MG1 are set to 0, the motor MG1 is stopped. Further, the motors MG2 and MG3 are controlled so that the torque command values Tm2* and Tm3* are output.

On the contrary, when the battery state of charge SOC is less than the predetermined state of charge S1 (S106:No), it is judged that the electric power required for moving the vehicle backward is not left in the battery 70. The control routine then proceeds to S110 where the target engine output value Pe* is set to a backward movement time output value Ps and the torque command value Tm1* and the target number of rotations Nm1* of the motor MG1 are set to a target engine torque Te* and an target engine speed Ne*, respectively, which are set as a drive point of the target engine output value Pe*. Here, the target engine torque Te* and the target engine speed Ne* are previously set as a drive point having a highest engine efficiency among the drive points (points determined on the basis of torque and the number of rotations) capable of outputting the target engine output value Pe* from the engine 22. In the embodiment, the relation among the target engine output value Pe*, the target engine torque Te* and the target engine speed Ne* is previously stored as a map. Accordingly, when the target engine output value Pe* is set, the target engine torque Te* and the target engine speed Ne* corresponding to the target engine output value Pe* are obtained from the map.

The control routine proceeds to S112 where the torque command values Tm2* and Tm3* of the motors MG2 and MG3 are set so that the required drive shaft torque Td* is distributed to the front wheels and the rear wheels at the backward movement torque ratio DT. Then, in S114 ECU 80 outputs the target engine output value Pe*, the torque commands Tm1*, Tm2* and Tm3* of the motors MG1, MG2 and MG3 and the target number of rotations Nm1 * of the motor MG1 to the engine ECU 28 and the motor ECU 78 through the communication ports. Subsequently, the control routine ends. Here, because the backward movement time output value Ps is set as the target engine output value Pe*, the driving of the engine 22 is controlled at the drive point that is set as the target engine output value Pe* by the engine ECU 28, that is, the drive point set on the basis of the target engine torque Te* and the target engine speed Ne*. Further, since the driving of the motor MG1 is controlled to regenerate by the motor ECU 78 at the drive point of the target number of rotations Nm1* and the torque command value Tm1*, the motor MG1 generates power by using the power from the engine 22, and the power is supplied to the motors MG2 and MG3. When electric power generation of the motor MG1 is greater than power consumption of the motors MG2 and MG3, surplus electric power is charged in the battery 70. On the contrary, when electric power generation of the motor MG1 is smaller than the power consumption of the motors MG2 and MG3, a shortfall is compensated by the discharge from the battery 70.

The hybrid motor vehicle 20 of the aforementioned embodiment is constructed so that, at a time of moving backward, the ring gear shaft 37, that is, the front axle 50 is disengaged from the planetary gear 31 by the clutch C2, and the carrier 35 and the ring gear 36, that is, the crank shaft 24 and the sun gear shaft 33 are engaged to each other by the clutch C1. This is a series-type hybrid electric motor vehicle. Accordingly, by the motor MG2 and the motor MG3, it is possible to output torque corresponding to the depression of the accelerator pedal 85 to the front axle 50 and the rear axle 60 at a suitable torque distribution at a time of backward movement. Further, when the battery state of charge SOC becomes less than the predetermined state of charge S1, the ECU 80 makes the motor MG1 generate electric power by using power obtained by driving the engine 22. As a result, it is possible to compensate a part or a whole of the electric power consumption of the motor MG2 and the motor MG3 by the electric power generation of the motor MG1.

Figure 4:
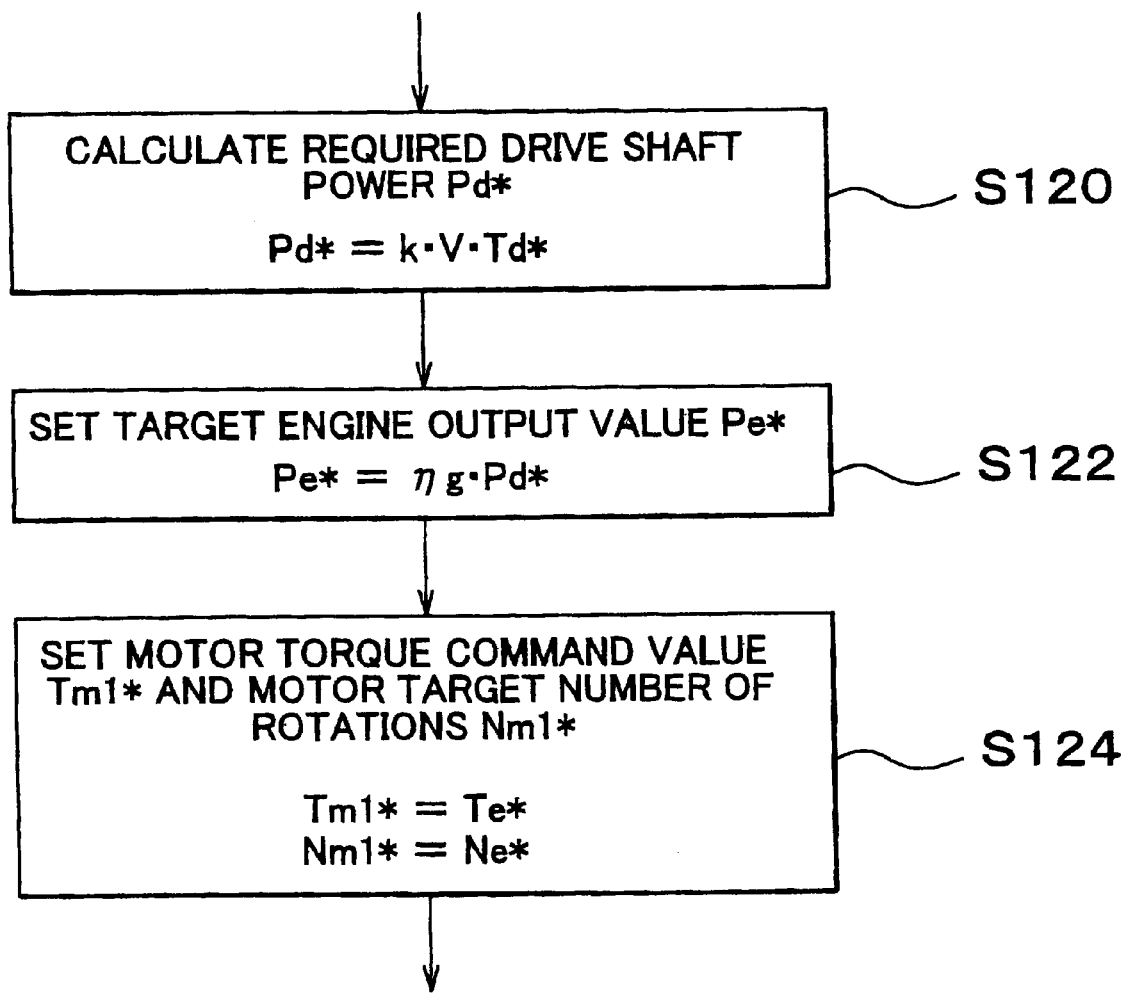
FIG. 4 is a flow chart of a backward movement control routine according to another exemplary embodiment of the invention.

In the hybrid motor vehicle 20 of the embodiment, when the battery state of charge SOC is less than the predetermined state of charge S1, the backward movement time output value Ps is set to the target engine output value Pe* regardless of the required drive shaft torque Td*. Further, an excess and a deficiency of the electric power consumption of the motor MG2 and the motor MG3 with respect to the electric power generation of the motor MG1 can be compensated by the charge and discharge of the battery 70, respectively. The structure may be made such that the target engine output value Pe* is set in correspondence to the required drive shaft torque Td*, and the electric power consumption of the motor MG2 and the motor MG3 is just compensated by the electric power generation of the motor MG1. In this case, in place of the process of S110 in the backward movement control routine in FIG. 2, processes in S120 to S124 in a routine shown in FIG. 4 may be executed. That is, in S120 the required drive shaft power Pd* is calculated by multiplying the required drive shaft torque Td* by a number of rotations N1 (N1=r·V) of the front axle 50, where N1 is obtained from the vehicle speed V in a proportional manner. The target engine output value Pe* is set in S122 by multiplying the calculated required drive shaft power Pd* by a reciprocal ηg of an efficiency of power generation. Then in S124, the target engine torque Te* at the drive point of the set target engine output value Pe* and the target engine speed Ne* are set to the torque command value Tm1* and the target number of rotations Nm1* of the motor MG1. Accordingly, it is possible to just compensate the electric power consumption of the motor MG2 and the motor MG3 by the electric power generation of the motor MG1.

The hybrid motor vehicle 20 of the embodiment is constructed such that torque is output to the front wheels 54 and 56 and the rear wheels 64 and 66 by using the backward movement torque ratio DT set as the torque ratio at a time of backward movement between torque output to the front wheels 54 and 56 and torque output to the rear wheels 64 and 66. Here, the battery SOC is not taken into account. When the battery state of charge SOC is less than the predetermined state of charge S1, another front and rear wheel torque ratio other than the preset backward movement torque ratio DT may be employed. For example, the structure may be made such that torque is not output from the front wheels 54 and 56. In accordance with this structure, it is possible to reduce the decrease of the battery state of charge SOC. Here, it is preferable that the front and rear wheel torque ratio is set to 1:9 to 9:1.

The hybrid motor vehicle 20 of the embodiment is operated to move backward by operating the clutches C1 and C2, as a series-type hybrid electric motor vehicle. Even when the battery SOC is less than the predetermined state of charge S1, if the engine 22 is not to be driven, this structure can apply to an electric motor vehicle provided with no engine 22, for example, an electric motor vehicle structured such that power is output from electric motors mounted to the front wheels and the rear wheels by using electric power from the battery 70, or an electric motor vehicle structured such that power is output to four wheels from respective electric motors by using electric power from the battery 70. In this case, when the battery state of charge SOC is less than the predetermined state of charge S1, it is preferable to set another front and rear wheel torque ratio other than the preset backward movement torque ratio, for example, it is preferable to not output torque from the front wheels 54 and 56 and only the minimum required torque is output from the rear wheels 64 and 66. Accordingly, it is possible to reduce the decrease of the battery state of charge SOC. Here, it is preferable that the front and rear wheel torque ratio is set to 1:9 to 9:1.

The hybrid motor vehicle 20 of the embodiment is constructed such that the motor MG3 is attached to the rear axle 60 via the differential gear 62. The structure may be made such that two motors are directly attached to the rear wheels 64 and 66. In this case, both of the motors may be independently controlled by using the torque command value Tm3* of the motor MG3.

The aforementioned hybrid motor vehicle 20 of the embodiment is described as a four-wheel drive motor vehicle. However, it is possible to apply the invention to a six-wheel drive motor vehicle having auxiliary drive wheels, for example, a motor vehicle that is four wheel drive and tows a vehicle having auxiliary drive wheels. In this case, the structure may be made such that the motor is attached to the axis of the auxiliary drive wheel, and the electric power consumed or regenerated by this motor and the motor MG3 attached to the rear axle 60 via the differential gear 62 may coincide with the electric power consumed or regenerated by the motor MG3 in the hybrid motor vehicle 20 of the embodiment. The backward movement torque ratio DT may or may not include torque of the auxiliary drive wheel.

Figure 5:
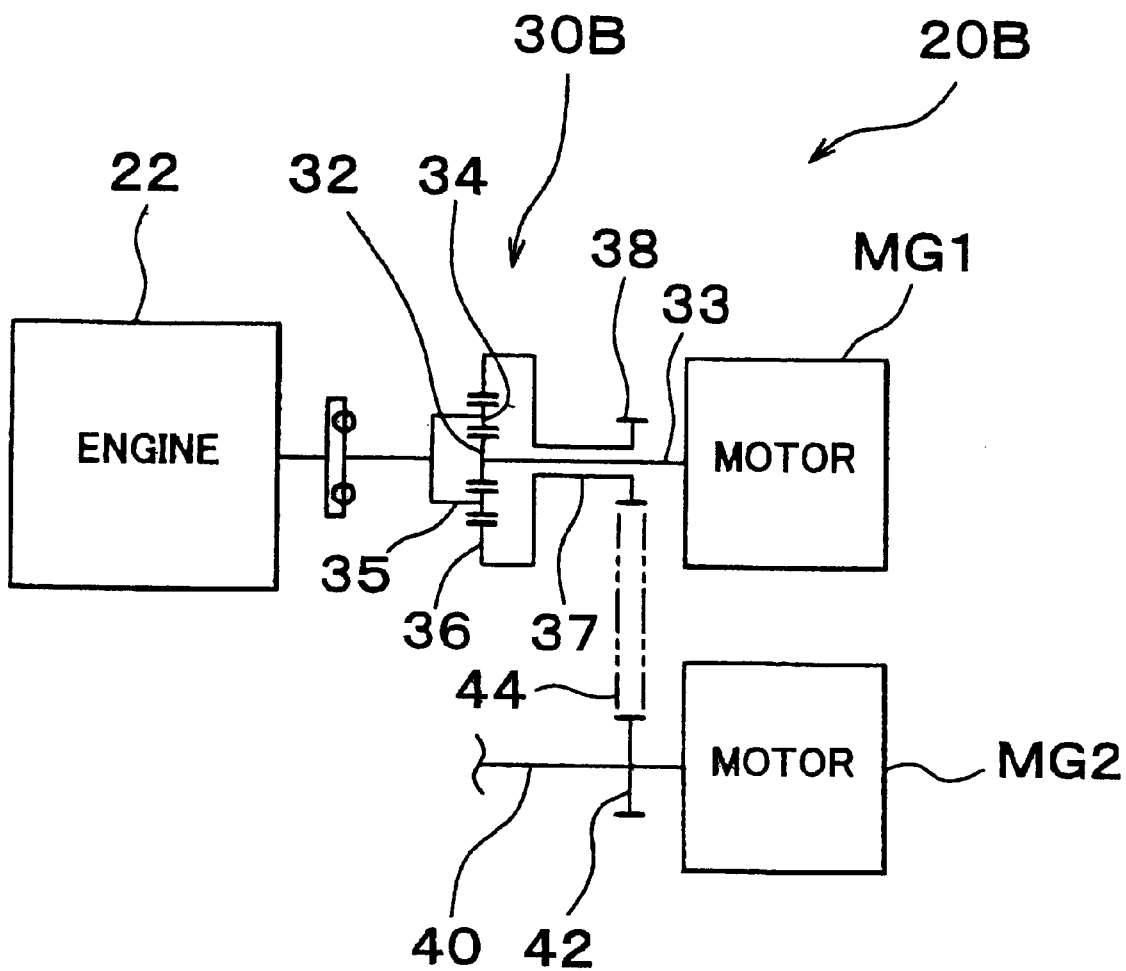
FIG. 5 is a schematic diagram exemplifying a part of a structure of a hybrid motor vehicle of another exemplary embodiment.
Figure 6:
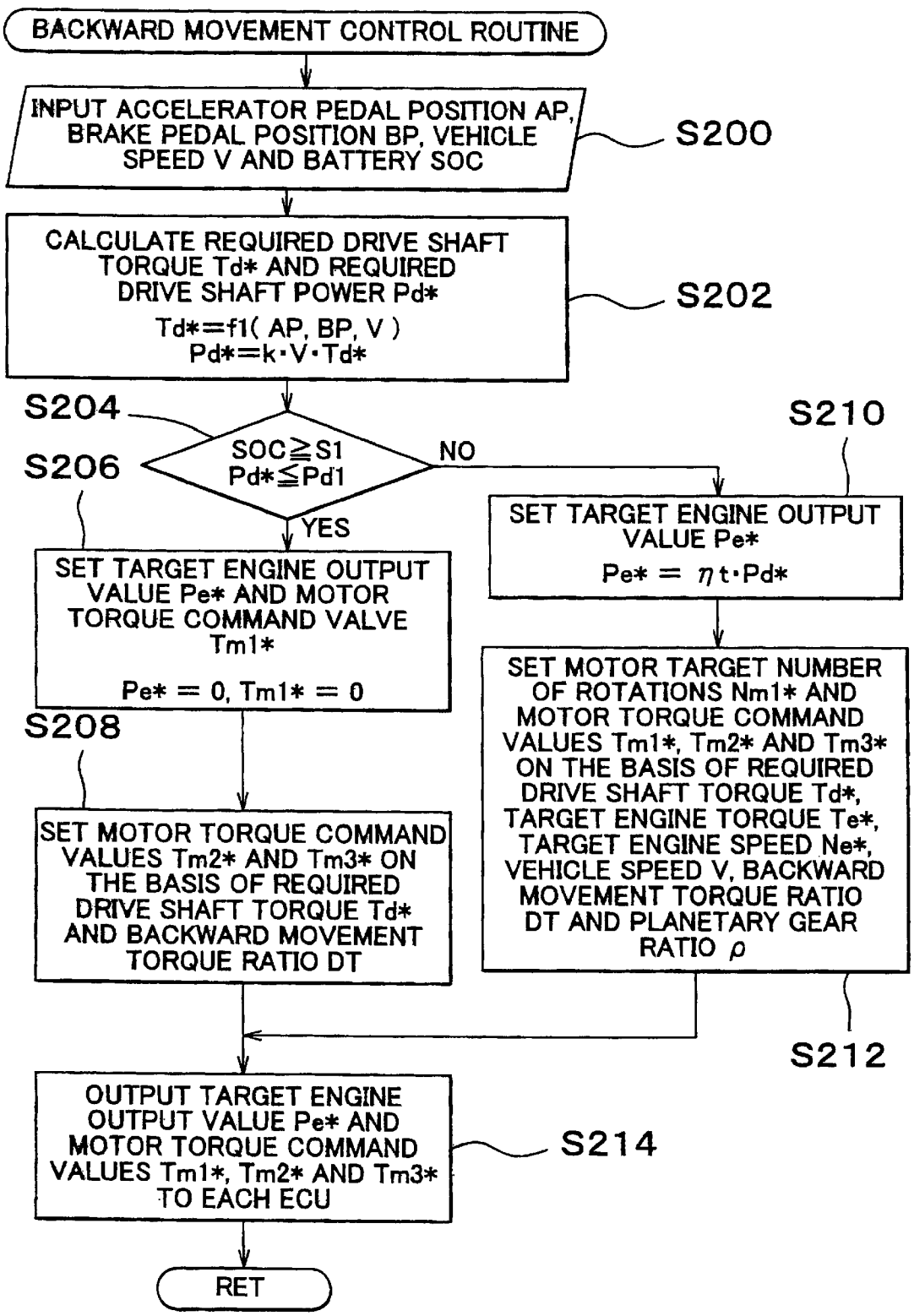
FIG. 6 is a flow chart of a backward movement control routine executed by the hybrid motor vehicle of FIG. 5.

The hybrid motor vehicle 20 of the embodiment is structured as a series-type hybrid type electric motor vehicle by operating the clutches C1 and C2 at a time of backward movement. However, as shown in a part of the structure of the hybrid motor vehicle 20B of another exemplary embodiment in FIG. 5, the structure may be made such that the gear unit 30B is not provided with the clutches C1 and C2. In this case, a backward movement control routine shown in FIG. 6 is executed in place of the backward movement control routine shown in FIG. 2. A description will be given below of a backward movement control in a hybrid motor vehicle 20B of another exemplary embodiment of the aforementioned embodiment.

When the backward movement control routine is executed, the control routine proceeds to S200 where the CPU of the ECU 80 reads the vehicle speed V detected by the vehicle speed sensor 81, the accelerator pedal position AP detected by the accelerator pedal position sensor 86, the brake pedal position BP detected by the brake pedal position sensor 88, and the battery state of charge SOC calculated by the battery ECU 71, via the communication ports. Then, the control routine proceeds to S202 where a process of calculating the required drive shaft torque Td* and the required drive shaft power Pd* is executed on the basis of the accelerator pedal position AP, the brake pedal position BP and the vehicle speed V which are read (step S202). Then, in S204 the battery state of charge SOC is compared with the predetermined state of charge S1 and the required drive shaft power Pd* is compared with a predetermined power Pd1. Here, the predetermined power Pd1 is a power that can be compensated by the discharged electric power from the battery 70 without the output from the engine 22, and can be determined by the capacity and the performance of the battery 70.

Figure 7:
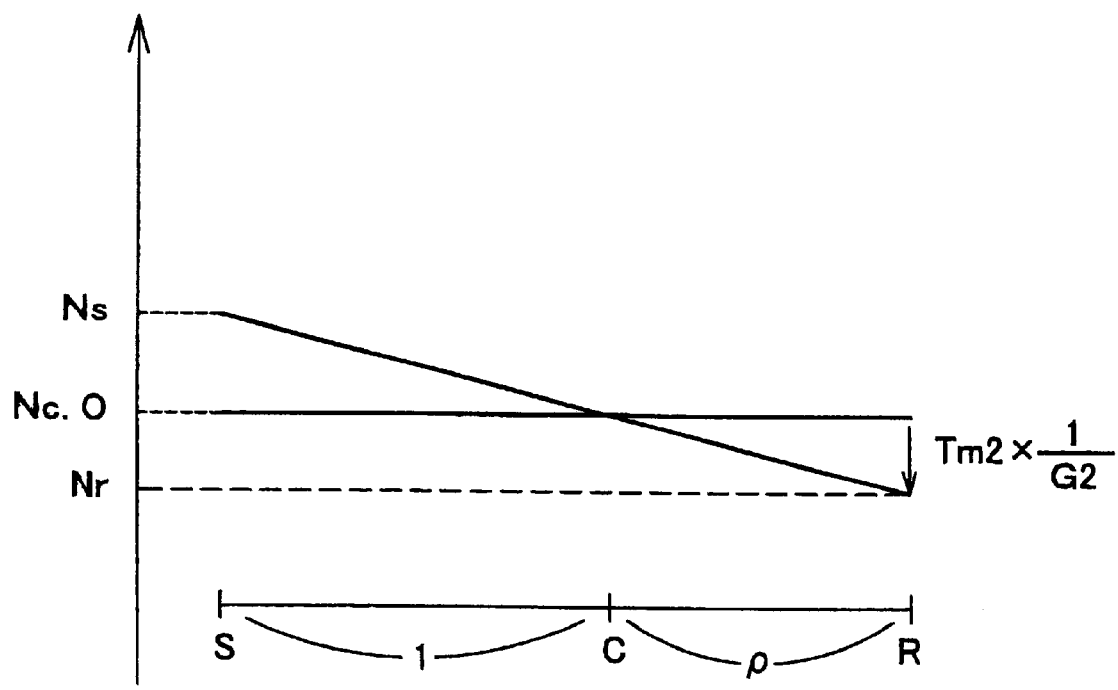
FIG. 7 is a diagram explaining an example of an alignment graph at a time of backward movement with the engine being stopped.

When the battery state of charge SOC is equal to or more than the predetermined state of charge S1 and the required drive shaft power Pd* is equal to or less than the predetermined power Pd1 (S204:Yes), the control routine proceeds to S206 where target engine output value Pe* and the torque command value Tm1 * of the motor MG1 are set to 0. Then, in S208 the torque command values Tm2* and Tm3* of the motors MG2 and MG3 are set so that the drive shaft torque Td* is distributed to the front wheels and the rear wheels at the backward movement torque ratio DT. The control routine proceeds to S214 where the ECU 80 outputs the target engine output value Pe* and the torque commands Tm1*, Tm2* and Tm3* of the motors MG1, MG2 and MG3 to the engine ECU 28 and the motor ECU 78 through the communication ports. Subsequently, the control routine ends. In accordance with this process, the required drive shaft torque Td* is output as torque distributed at the backward movement torque DT to the front axle 50 and the rear axle 60. In the hybrid motor vehicle 20B of the embodiment, the gear unit 30B is not provided with the clutches C1 and C2, so a part of the torque output from the motor MG2 is used to rotate the engine 22 or the motor MG1. Since an inertia of the motor MG1 is normally smaller than an inertia of the engine 22, the motor MG1 is rotated. This state is shown in FIG. 7 as an alignment graph used in the field of the mechanism of machinery. In FIG. 7, G2 denotes a number of rotations Nr of the ring gear shaft 37 with respect to a number of rotations Nm2 of the rotating shaft 40 in the motor MG2 (G2=Nr/Nm2).

Figure 8:
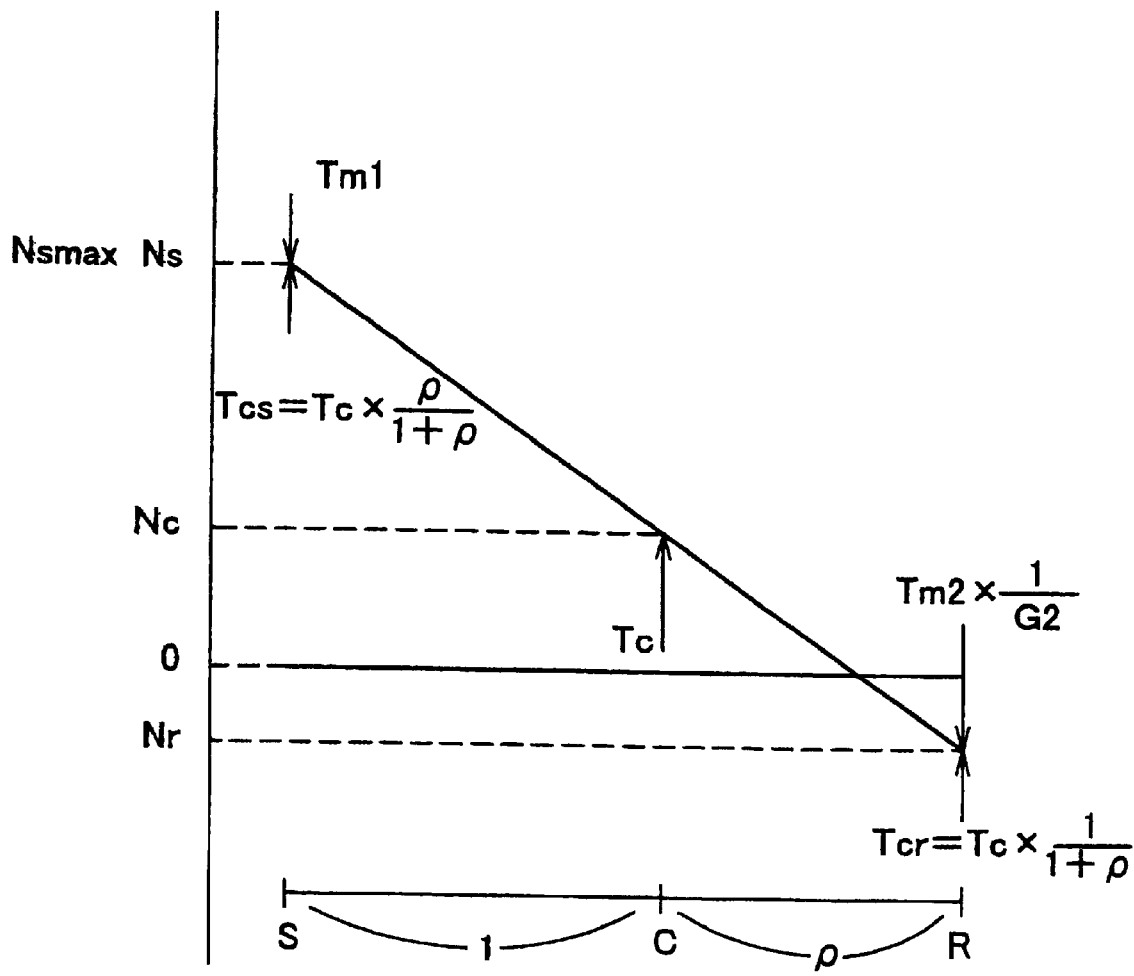
FIG. 8 is a diagram explaining an example of an alignment graph at a time of backward movement while outputting power from the engine.

On the contrary, when the battery state of charge SOC is less than the predetermined state of charge S1 or the required drive shaft power Pd* is larger than the predetermined power Pd1 (S264:No), the control routine proceeds to S210 where target engine output value Pe* is set by multiplying the required drive shaft power Pd* by a reciprocal $\eta t$ of an efficiency $\eta e$ of a torque conversion with respect to the output of the engine 22. Then, in S212 torque command values Tm1*, Tm2* and Tm3* of the motors MG1, MG2 and MG3 and the target number of rotations Nm1* of the motor MG1 are set so that the electric power consumption of the motor MG2 and the motor MG3 is just compensated by the electric power generation of the motor MG1, and the required drive shaft torque Td* is output to the front axle 50 and the rear axle 60 at the backward movement torque ratio DT. FIG. 8 shows an alignment graph at a time of backward movement while outputting the power from the engine 22. Here, it is preferable that the backward movement torque ratio DT is set to 1:9 to 9:1. The target engine speed Ne* corresponds to the number of rotations Nr of the carrier 35.

The number of rotations Nr of the ring gear shaft 37 can be expressed as r·V·G1·G2 from the vehicle speed V by using the ratio of number of rotations ratio G1 (G1=Nm2/N1) and the number of rotations ratio G2. Accordingly, the target number of rotations Nm1* of the motor MG1 can be calculated with a formula (1). In this case, as shown in FIG. 8, since the ring gear 36 reversely rotates and a certain number of rotations is required for the carrier 35, the sun gear 32, and thus the motor MG1, rotates at a high speed. Accordingly, in some cases, the calculated target number of rotations Nm1* of the motor MG1 is more than a rated maximum number of rotations Nmax of the motor MG1. Here, the rated maximum number of rotations Nmax is set as the target number of rotations Nm1* of the motor MG1. Further, the target engine speed Ne* and the target engine torque Te* as the drive points of the engine 22 are set to values calculated with formulas (2) and (3) on the basis of the target number of rotations Nm1*. Then, the torque command value Tm1* of the motor MG1 is calculated with a formula (4), and the torque command values Tm2* and Tm3* of the motors MG2 and MG3 are calculated with formulas (5) and (6) on the basis of the target engine torque Te*, the required drive shaft torque Td* and the backward movement torque ratio DT. Here, G3 denotes a ratio of the number of rotations Nm3 of the motor MG3 with respect to the number of rotations N2 of the rear axle 60 (G3=Nm3/N2).

$$Nm1^* = r \cdot V \cdot G1 \cdot G2 - (r \cdot V \cdot G1 \cdot G2 - Ne^*) \cdot ((1+\rho)/\rho) \quad (1)$$

$$Ne^* = r \cdot V \cdot G1 \cdot G2 - (r \cdot V \cdot G1 \cdot G2 - N\max) \cdot (\rho/(1+\rho)) \quad (2)$$

$$Te^* = Pe^*/Ne^* \quad (3)$$

$$Tm1^* = Te^* \cdot (1/(1+\rho)) \quad (4)$$

$$Tm2^* = (1/G1) \cdot (Td^*/(1+DT)) - (G2 \cdot Te^*) \cdot (1/(1+\rho)) \quad (5)$$

$$Te3^* = (1/G3) \cdot (DT \cdot Td^*)/(1+DT) \quad (6)$$

Then, in S214 the ECU 80 outputs the target engine torque Te*, the target engine speed Ne*, the torque commands Tm1*, Tm2* and Tm3* of the motors MG1, MG2 and MG3, and the target number of rotations Nm1* of the motor MG1 to the engine ECU 28 and the motor ECU 78. Subsequently, the routine ends. This process allows the power output from the engine 22 to be converted into torque, and the required drive shaft torque Td* to be output by distributing at the backward movement torque ratio DT to the front axle 50 and the rear axle 60 without accompanying the charge and discharge of the battery 70.

When the battery state of charge SOC is less than the predetermined state of charge S1 or when the required drive shaft power Pd* is larger than the predetermined power Pd1, the hybrid motor vehicle 20B of the modified embodiment outputs the required drive shaft torque Td* as torque distributed at the backward movement torque ratio DT to the front axle 50 and the rear axle 60. Here, the power from the engine 22 is not converted into torque so as to charge and discharge the battery 70. The structure may be arranged such that the required drive shaft torque Td* is output as torque distributed at the backward movement torque ratio DT to the front axle 50 and the rear axle 60 while accompanying the charge and discharge of the battery 70. In this case, in place of the process of S210 of the backward movement control routine in FIG. 6, the backward movement time output value Ps may be set to the target engine output value Pe*. Accordingly, it is possible to output the required drive shaft torque Td* as torque distributed at the backward movement torque ratio DT to the front axle 50 and the rear axle 60 by using the power from the engine 22 while accompanying the charge and discharge of the battery 70.

The state of charge S1 may be not predetermined value, be determined by a state of the vehicle. The aforementioned embodiment and modified embodiments may include an inclination device that detects inclination of the vehicle. In this case, the predetermined state of charge S1 is determined based on the degree of inclination.

In the aforementioned embodiment and modified embodiments, the rotating shaft 40 and the front axle 50 function to be the first drive shaft of the invention. The sun gear 33 functions to be the power splitting and integrating shaft of the invention. The gear unit 30 functions to be the power splitting and integrating mechanism of the invention. The motor MG1 functions to be the first electric driving apparatus for power splitting and integration of the invention. The motor MG2 functions to be the second electric driving apparatus of the invention. The motor MG3 functions to be the third electric driving apparatus of the invention. The ECU 80 functions to be the reverse rotation driving controller and the backward movement driving controller of the invention. The clutch C2 functions to be the first disengaging mechanism of the invention. The clutch C1 functions to be the second disengaging mechanism of the invention.

In the aforementioned embodiments and modified embodiments, the following effects can be obtained. Firstly, it is possible to output the power for reverse rotation opposite the normal rotation to the first drive shaft to which a part of the power from the internal combustion engine is directly output and another drive shaft, by the power output apparatus of the invention. Secondly, the power output apparatus of the invention allows effective output of power for reverse rotation opposite the normal rotation to the first drive shaft and another drive shaft. Thirdly, the power output apparatus of the invention allows output of power to the first drive shaft and another drive shaft at the desired torque ratio for reverse rotating opposite the normal rotation and having the desired magnitude. Fourthly, the motor vehicle of the invention can efficiently, and at the desired magnitude, output the power for backward movement to the front axle to which a part of the power output from the internal combustion engine is directly output as the power for moving the vehicle forward, and the rear axle, at the desired front and rear wheel torque ratio.

While the invention has been described with reference to preferred embodiments thereof, it is to be understood that the invention is not limited to the preferred embodiments or constructions. To the contrary, the invention is intended to cover various modifications and equivalent arrangements within the sprit and scope of the invention.

What is claimed is:

1. A power output apparatus, comprising:
a plurality of drive shafts, including a first drive shaft;
an internal combustion engine having an output shaft;
a power splitting and integrating mechanism connected to three rotating shafts comprising the output shaft in the internal combustion engine, the first drive shaft and a power splitting and integrating shaft, and structured such that when a power is input from any one of the three rotating shafts, the power is split into the other two rotating shafts, and when the power is input from any two of the three rotating shafts, the input power is integrated to be output to the other rotating shaft;
a first electric driving apparatus for power splitting and integration connected to the power splitting and integrating shaft and capable of generating electric power;

a second electric driving apparatus connected to the first drive shaft and capable of generating electric power;

a third electric driving apparatus connected to at least one drive shaft other than the first drive shaft and capable of generating electric power;

a battery capable of sending and receiving electric power with respect to the first electric driving apparatus, the second electric driving apparatus and the third electric driving apparatus, respectively;

a state of charge detecting apparatus that detects a state of charge of the battery; and a reverse rotation driving controller that controls driving of the internal combustion engine, driving of the first electric driving apparatus, driving of the second electric driving apparatus and driving of the third electric driving apparatus on the basis of the detected state of charge so that a power for reverse rotation opposite a normal rotation is output to the first drive shaft and the at least one drive shaft connected to the third electric driving apparatus at a predetermined torque ratio.

2. A power output apparatus according to claim 1, wherein the reverse rotation driving controller controls the driving of the second electric driving apparatus and the driving of the third electric driving apparatus so that the power for reverse rotation is output to the first drive shaft and the at least one drive shaft connected to the third electric driving apparatus from the second electric driving apparatus and the third electric driving apparatus by using the electric power from the battery when the state of charge of the battery is equal to or more than a first value.

3. A power output apparatus according to claim 1, wherein the reverse rotation driving controller controls the driving of the internal combustion engine so that the power from the internal combustion engine is converted into torque so as to be output as the power for reverse rotation to the first drive shaft and the at least one drive shaft connected to the third electric driving apparatus when the state of charge of the battery is equal to or less than a second value.

4. A power output apparatus according to claim 1, wherein the reverse rotation driving controller sets a target power as a target value of the power for reverse rotation, and controls the driving of the internal combustion engine, the driving of the first electric driving apparatus, the driving of the second electric driving apparatus and the driving of the third electric driving apparatus on the basis of the state of charge detected by the state of charge detecting apparatus and the target power so that the power for reverse rotation is output to the first drive shaft and the at least one drive shaft connected to the third electric driving apparatus at a the predetermined torque ratio.

5. A power output apparatus according to claim 4, wherein the reverse rotation driving controller controls the driving of the second electric driving apparatus and the driving of the third electric driving apparatus so that the target power is output to the first drive shaft and the at least one drive shaft connected to the third electric driving apparatus from the second electric driving apparatus and the third electric driving apparatus by using the electric power from the battery when the detected state of charge of the battery is equal to or more than a first state of charge and the set target power is equal to or less than a first power.

6. A power output apparatus according to claim 4, wherein the reverse rotation driving controller controls the driving of the internal combustion engine so that the power from the internal combustion engine is converted into torque to be output as the target power to the first drive shaft and the at least one drive shaft connected to the third electric driving apparatus when at least one of the conditions in which the detected state of charge of the battery is less than a first state of charge and the set target power is equal to or more than the first power, is satisfied.

7. A power output apparatus according to claim 4, wherein the reverse rotation driving controller controls the driving of the internal combustion engine and at least one of the driving of the first electric driving apparatus, the driving of the second electric driving apparatus and the driving of the third electric driving apparatus so that the target power is output to the first drive shaft and at least one drive shaft connected to the third electric driving apparatus by using the charged and discharged electric power of the battery and the power from the internal combustion engine when at least one of the conditions in which the detected state of charge of the battery is less than a first state of charge and the set target power is equal to or more than the first power, is satisfied.

8. A power output apparatus according to claim 7, wherein the reverse rotation driving controller controls at least one of the driving of the first electric driving apparatus, the driving of the second electric driving apparatus and the driving of the third electric driving apparatus by using the discharged electric power of the battery.

9. A motor vehicle including the power output apparatus according to claim 1, wherein the first drive shaft is connected to a front axle connected to a front wheel of the vehicle, the at least one drive shaft connected to the third electric driving apparatus is connected to a rear axle connected to a rear wheel of the vehicle, and the normal rotation is a rotation for moving the vehicle forward.

10. A motor vehicle according to claim 9, wherein the predetermined torque ratio is a value having a ratio of the rear wheel with respect to torque applied to the front wheel that is within a range of 1:9 to 9:1.

11. A motor vehicle including the power output apparatus according to claim 1, wherein the first drive shaft is connected to a rear axle connected to a rear wheel of the vehicle, the at least one drive shaft connected to the third electric driving apparatus is connected to an axle connected to a wheel of the vehicle including a front axle connected to a front wheel of the vehicle, and the normal rotation comprises a rotation for moving the vehicle forward.

12. A motor vehicle according to claim 11, wherein the predetermined torque ratio is a value having a ratio of the rear wheel with respect to torque applied to the front wheel that is within a range of 1:9 to 9:1.

13. A power output apparatus, comprising:

a plurality of drive shafts including a first drive shaft;

an internal combustion engine having an output shaft;

a power splitting and integrating mechanism connected to three rotating shafts comprising the output shaft in the internal combustion engine, the first drive shaft and a power splitting and integrating shaft, and structured such that when a power is input from any one of the three rotating shafts, the power is split into the other two rotating shafts, and when the power is input from any two of the three rotating shafts, the input power is integrated to be output to the other rotating shaft;

a first electric driving apparatus for power splitting and integration connected to the power splitting and integrating shaft and capable of generating electric power;

a second electric driving apparatus connected to the first drive shaft and capable of generating electric power;

a third electric driving apparatus connected to at least one drive shaft other than the first drive shaft and capable of generating electric power;

a battery capable of sending and receiving electric power with respect to the electric driving apparatus for power splitting and integration, the first electric driving apparatus and the second electric driving apparatus, respectively;

a first engaging and disengaging mechanism that engages the power splitting and integrating mechanism and the first drive shaft and disengages the power splitting and integrating mechanism from each other; and a reverse rotation driving controller that controls driving of the first engaging and disengaging mechanism so that the power splitting and integrating mechanism and the first drive shaft are disengaged each other, and that controls the driving of the second electric driving apparatus and the driving of the third electric driving apparatus so that a power for reverse rotation in a direction opposite to a normal rotation is output to the first drive shaft and the at least one drive shaft connected to the third electric driving apparatus at a predetermined torque ratio.

14. A power output apparatus according to claim 13, further comprising:

a second engaging and disengaging mechanism that directly engages the output shaft of the internal combustion engine to the power splitting and integrating shaft and disengages the direct engagement, wherein the reverse rotation driving controller controls the driving of the second engaging and disengaging mechanism so that the output shaft of the internal combustion engine is directly engaged to the power splitting and integrating shaft, and controls the driving of the internal combustion engine and the driving of the first electric driving apparatus so that at least a part of the electric power generated by the first electric driving apparatus by using the power from the internal combustion engine is supplied to the second electric driving apparatus and the third electric driving apparatus.

15. A power output apparatus according to claim 14, wherein the reverse rotation driving controller controls the driving of the second electric driving apparatus, the driving of the third electric driving apparatus, the driving of the internal combustion engine and the driving of the first electric driving apparatus so that the electric power consumed by the second electric driving apparatus and the third electric driving apparatus is compensated by the electric power generated by the first electric driving apparatus by using the power from the internal combustion engine.

16. A power output apparatus according to claim 13, further comprising:

a second engaging and disengaging mechanism that directly engages the output shaft of the internal combustion engine to the power splitting and integrating shaft and disengage the direct engagement; and a state of charge detecting apparatus that detects the state of charge of the battery, wherein the reverse rotation driving controller controls the driving of the second engaging and disengaging mechanism so that the output shaft of the internal combustion engine is directly engaged to the power splitting and integrating shaft when the state of charge detected by the state of charge detecting apparatus is equal to or less than a threshold value, and controls the driving of the internal combustion engine and the driving of the first electric driving apparatus so that at least a part of the electric power obtained by convening the power from the internal combustion engine is supplied to the second electric driving apparatus and the third electric driving apparatus.

17. A power output apparatus according to claim 16, wherein the reverse rotation driving controller controls the driving of the internal combustion engine, the driving of the first electric driving apparatus, the driving of the second electric driving apparatus and the driving of the third electric driving apparatus, so that the electric power consumed by the second electric driving apparatus and the third electric driving apparatus is compensated by electric power generated by the first electric driving apparatus by using the power from the internal combustion engine.

18. A power output apparatus according to claim 13, wherein the reverse rotation driving controller sets a target power as a target value of the power for reverse rotation, and controls the driving of the second electric driving apparatus and the driving of the third electric driving apparatus so that the target power is output from the second electric driving apparatus and the third electric driving apparatus.

19. A motor vehicle including the power output apparatus according to claim 13, wherein the first drive shaft is connected to a front axle connected to a front wheel of a vehicle, the at least one drive shaft connected to the third electric driving apparatus is connected to a rear axle connected to a rear wheel of the vehicle, and the normal rotation comprises a rotation for moving the vehicle forward.

20. A motor vehicle according to claim 19, wherein the predetermined torque ratio is a value having a ratio of the rear wheel with respect to torque applied to the front wheel that is within a range of 1:9 to 9:1.

21. A motor vehicle including the power output apparatus according to claim 13, wherein the first drive shaft is connected to a rear axle connected to a rear wheel of the vehicle, the at least one drive shaft connected to the third electric driving apparatus is connected to an axle connected to a wheel of the vehicle including a front axle connected to a front wheel of the vehicle, and the normal rotation comprises a rotation for moving the vehicle forward.

22. A motor vehicle according to claim 21, wherein the predetermined torque ratio is a value having a ratio of the rear wheel with respect to torque applied to the front wheel that is within a range of 1:9 to 9:1.

23. A control method of a power output apparatus, the power output apparatus comprising:

a plurality of drive shafts including a first drive shaft;

an internal combustion engine having an output shaft;

a power splitting and integrating mechanism connected to three rotating shafts comprising the output shaft in the internal combustion engine, the first drive shaft and a power splitting and integrating shaft, and structured such that when a power is input from any one of the three rotating shafts, the power is split into the other two rotating shafts, and when the power is input from any two of the three rotating shafts, the input power is integrated to be output to the other rotating shaft;

a first electric driving apparatus for power splitting and integration connected to the power splitting and integrating shaft and capable of generating electric power;

a second electric driving apparatus connected to the first drive shaft and capable of generating electric power; and a third electric driving apparatus connected to at least one drive shaft other than the first drive shaft and capable of generating electric power;

a battery capable of sending and receiving electric power with respect to the first electric driving apparatus, the second electric driving apparatus and the third electric driving apparatus, respectively, the method comprising:

detecting a state of charge of the battery; and controlling the driving of the internal combustion engine, driving of the first electric driving apparatus, driving of the second electric driving apparatus and driving of the third electric driving apparatus on the basis of the detected state of charge so that a power for (reverse rotation opposite a normal rotation is output to the first drive shaft and the at least one drive shaft connected to the third electric driving apparatus at a predetermined torque ratio.

24. A control method of a power output apparatus, the power output apparatus comprising:

a plurality of drive shafts including a first drive shaft;

an internal combustion engine having an output shaft;

a power splitting and integrating mechanism connected to three rotating shafts comprising the output shaft in the internal combustion engine, the first drive shaft and a power splitting and integrating shaft, and structured such that when a power is input from any one of the three rotating shafts, the power is split into the other two rotating shafts, and when the power is input from any two of the three rotating shafts, the input power is integrated to be output to the other rotating shaft;

a first electric driving apparatus for power splitting and integration connected to the power splitting and integrating shaft and capable of generating electric power;

a second electric driving apparatus connected to the first drive shaft and capable of generating electric power;

a third electric driving apparatus connected to at least one drive shaft other than the first drive shaft and capable of generating electric power;

a battery capable of sending and receiving electric power with respect to the electric driving apparatus for power splitting and integration, the first electric driving apparatus and the second electric driving apparatus, respectively;

a first engaging and disengaging mechanism that engages the power splitting and integrating mechanism and the first drive shaft and disengages the power splitting and integrating mechanism from each other, the method comprising:

controlling driving of the first engaging and disengaging mechanism so that the power splitting and integrating mechanism and the first drive shaft are disengaged each other; and controlling at least the driving of the second electric driving apparatus and the driving of the third electric driving apparatus so that a power for reverse rotation against a normal rotation is output to the first drive shaft and at least one drive shaft connected to the third electric driving apparatus at a predetermined torque ratio.

* * * * *